United States Patent [19]

Clark et al.

[11] 4,423,363

[45] Dec. 27, 1983

[54] ELECTRICAL BRAKING TRANSITIONING CONTROL

[75] Inventors: Robert C. Clark; Joe C. Lambert, both of Charlottesville; Sherrill G. Thomas, Treviliaus, all of Va.

[73] Assignee: General Electric Company, Salem, Va.

[21] Appl. No.: 288,083

[22] Filed: Jul. 27, 1981

[51] Int. Cl.³ ............................................. H02P 3/12
[52] U.S. Cl. .................................. 318/375; 318/376; 318/380
[58] Field of Search ............... 318/273, 269, 379, 373, 318/374, 362, 364, 365, 375, 376, 381, 280, 293, 86, 87, 380; 361/8, 9, 13

[56] References Cited

U.S. PATENT DOCUMENTS

| | | | |
|---|---|---|---|
| 3,566,152 | 2/1971 | Casey et al. | 361/10 X |
| 3,843,912 | 10/1974 | Anderson | 318/258 |
| 3,868,549 | 2/1975 | Schaefer et al. | 361/13 |
| 3,958,163 | 5/1976 | Clark | 318/373 |
| 4,131,927 | 12/1978 | Tsuchiya et al. | 361/9 X |
| 4,186,333 | 1/1980 | Kremer | 318/376 |
| 4,214,288 | 7/1980 | Cavil et al. | 361/8 X |

*Primary Examiner*—Ulysses Weldon
*Attorney, Agent, or Firm*—Ormand R. Austin; Arnold E. Renner; James H. Beusse

[57] ABSTRACT

An electrical braking circuit provides smooth transitioning between regenerative and plug braking of a DC electric motor by use of a low ohmic value resistance path to maintain motor torque during transitioning. During initiation of electrical braking, a similar low ohmic resistance path momentarily connects the motor to a power source in order to establish proper magnetic flux in the motor to enable regenerative braking. Both resistance paths are disabled during motoring and braking modes of operation in order to minimize power loss in the resistance paths.

6 Claims, 7 Drawing Figures

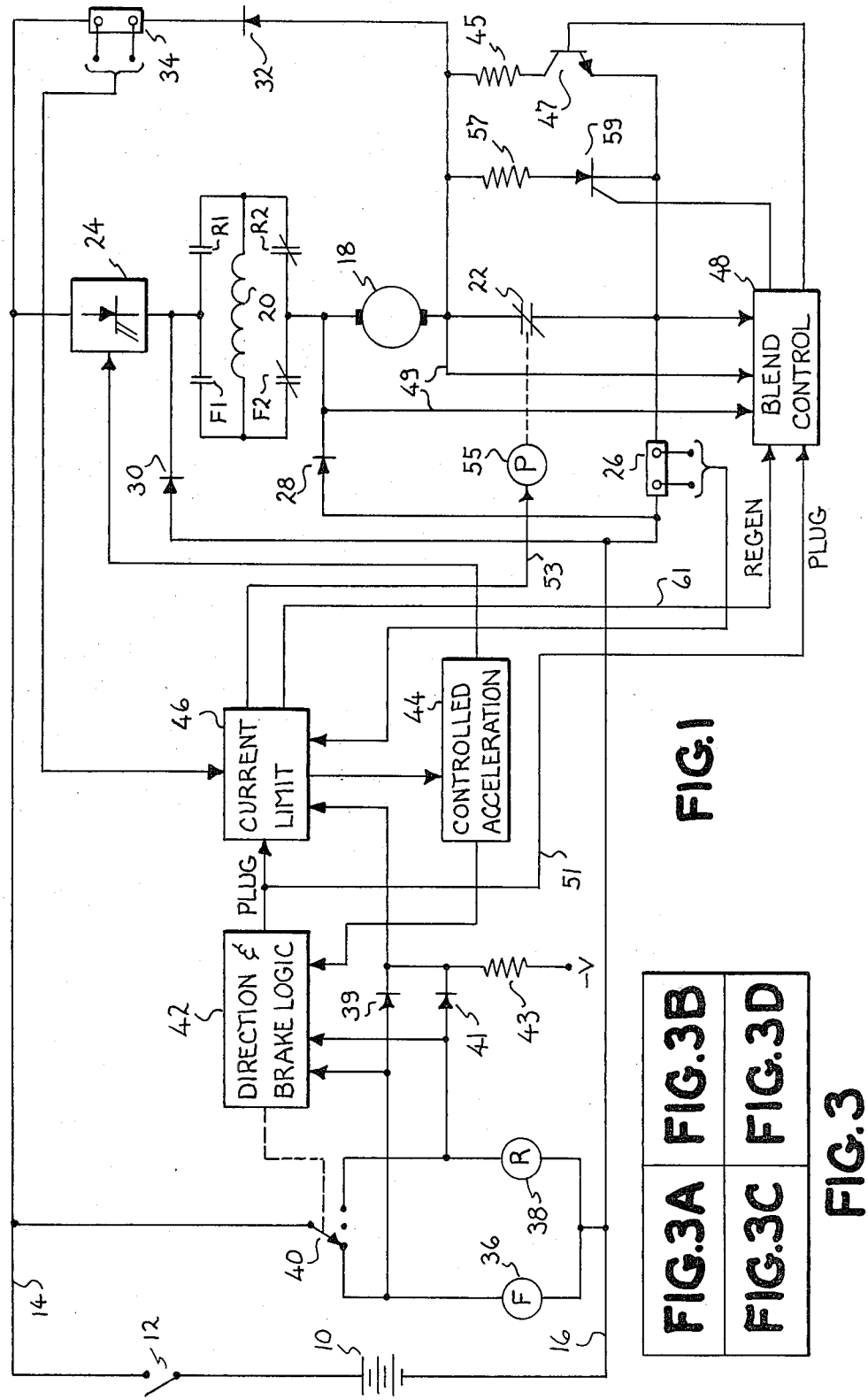

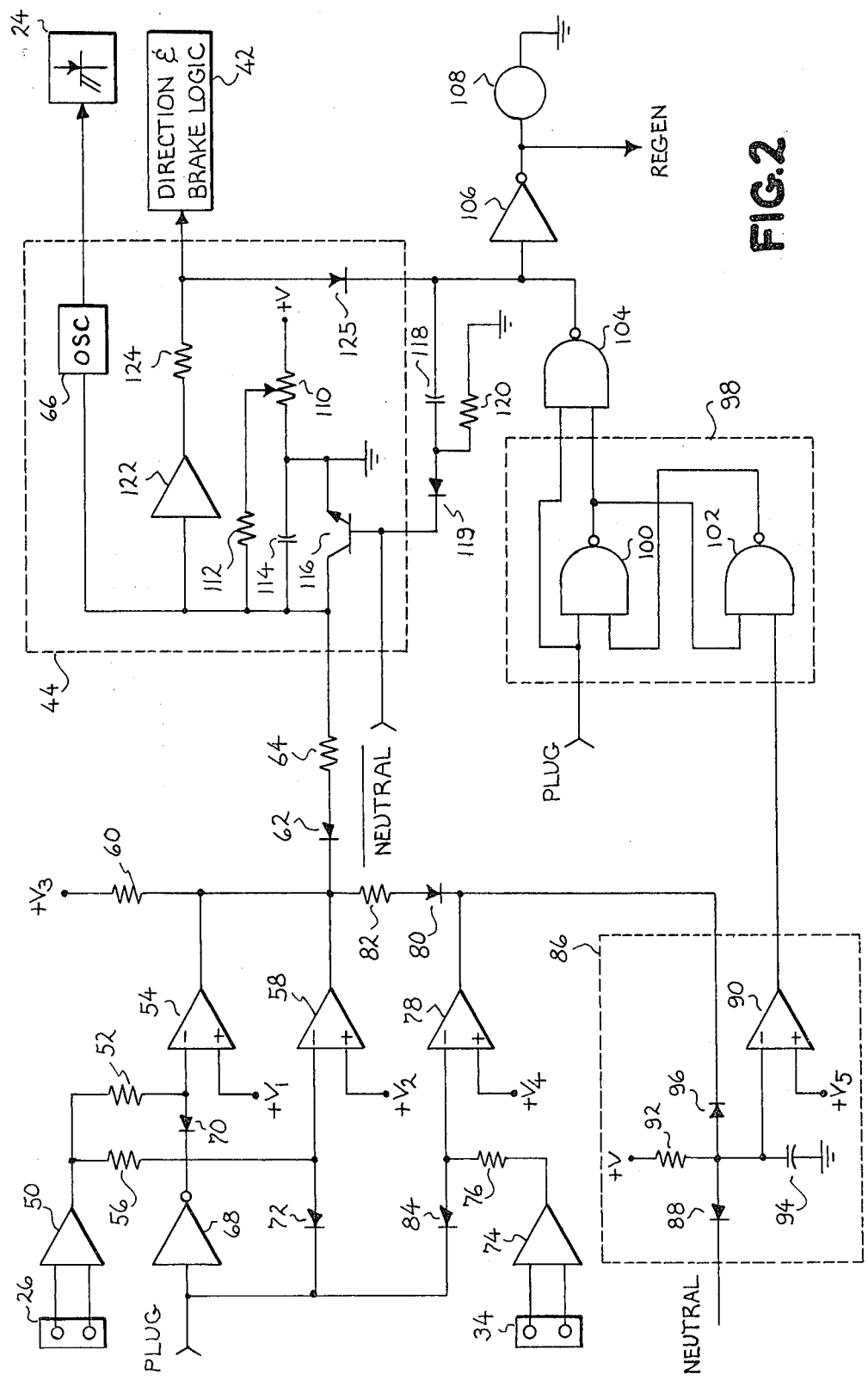

ELECTRICAL BRAKING TRANSITIONING CONTROL

BACKGROUND OF THE INVENTION

This invention is directed to electrical braking of direct current electric motors and, more particularly, to apparatus for smoothly transitioning into and out of regenerative electrical braking.

Electric vehicles such as locomotives, transit cars, forklift trucks or on-road vehicles which are powered by electric traction motors generally depend upon electrical braking by the traction motors to assist mechanical or friction brakes in stopping the vehicles. In order to provide this electrical braking effort, the traction motors are electrically controlled to operate as electrical generators driven by a rolling wheel of the vehicle. In operating as generators, the traction motors are effective to convert the kinetic energy of the vehicle to electrical energy. The chosen method of disposing of this electrical energy classifies the type of electrical braking being utilized. In general, only two types of electrical braking are in common use: dynamic braking in which the electrical energy is converted to thermal energy in resistive loads; and regenerative braking in which the electrical energy is transferred back to the power source. A subset of dynamic braking is "plug" braking in which case the resistance of the armature of the electric motor itself is utilized as the resistive load.

It is obvious that regenerative braking is a preferred method to use if the power source is capable of accepting the regenerative energy and using it for other loads or storing it for later use. However, efficient use of regenerative braking requires that the current developed by the electric motor be of greater magnitude than the field excitation necessary to generate the current. As is well known, the current developed by the electric motor is a function of motor field current and armature rotational velocity. Accordingly, as vehicle speed is reduced, the ability of the electric motor to regenerate energy is also reduced. In those systems in which a series wound traction motor is used such that a portion of the armature regenerated current is used as field current for the electric motor, a point will be reached at some speed at which all of the regenerated energy is necessary to maintain field excitation at a level to produce the desired braking torque and no energy is available to be regenerated to the source. At this speed, regenerative braking must be terminated and some form of dynamic or plug braking initiated. Thus, two separate transitions must be undertaken when the electric vehicle transitions from a propulsion to a braking mode of operation: a first in going from propulsion to regenerative braking followed by a second in going from regenerative to dynamic braking.

When a series wound electric traction motor is used for a propulsion vehicle, the transition from a propulsion mode to an electrical braking mode requires that either the field winding or the armature of the motor be reconnected in a reverse configuration from that used in the propulsion mode. In most instances, the preferred method is to reverse the field winding connections. Since this reversal of the field winding connections will also reverse the polarity of the voltage on the armature which will now act as a generator, a contactor is normally used to reconnect the armature into the proper arrangement for regenerative braking. In many instances the residual flux in the armature and field winding will be sufficient to permit regenerative braking to be established as soon as the reconnection has occurred. However, in some instances the residual flux is either of the wrong polarity or is insufficient to permit regenerative braking to be established. In order to assure that regenerative braking is established, many prior art systems have incorporated a resistance which connects the motor armature to the battery in such a manner that a current path through the motor is established in a direction to insure initiation of regenerative braking. However, such a resistance, regardless of size, may consume from five to ten percent of the available regenerative energy and in addition create excessive heat dissipation problems. For example, a five thousand pound vehicle traveling at ten miles per hour has an initial inertial energy of twenty-two thousand seven hundred twenty-three watt-seconds.

When the speed of the vehicle has dropped to such a level that the motor velocity is insufficient to sustain the regenerative current at the desired braking torque, and therefore to regenerate energy into the power source, the control circuitry must convert the motor power circuit from a regenerative configuration to a dynamic brake configuration. In performing the switching function, field current is normally reduced to zero to reduce the armature potential to zero whereby the armature can again be connected to the power source in its driving or propulsion mode configuration without producing large current transients. With no armature current and no armature potential, a contactor can be used to reconnect the armature to the power source without arcing or burning the contactor tips. After reconnection into a dynamic braking mode, field current again builds up to permit dynamic or plug braking of the electric motor. The transition from regenerative braking to dynamic braking with its attendant loss of braking effort due to reduction of field current and armature potential permits braking torque to die out and the gearing between the electric motor and the drive wheels to relax. The subsequent re-initiation of braking torque will result in a jerk reaction of the vehicle and, in the case of a forklift truck, could result in dropping of objects being carried.

It is an object of the present invention to provide an improved electrical braking arrangement for an electrically propelled vehicle.

It is a still further object of the present invention to provide an electric vehicle with a control circuit to allow smooth transitioning between propulsion and regenerative braking.

It is still another object of the present invention to provide an improved braking mode control system which allows smooth blending between regenerative and dynamic braking of an electric vehicle.

In accordance with the present invention, a series connected electric traction motor is arranged to provide propulsion power to the wheels of an electric vehicle. The control system for the traction motor includes apparatus for reversing the relative polarity of the field winding and armature winding in order to enable transition from a propulsion to a braking mode and also to permit reverse propulsion of the motor. Apparatus is provided for establishing a reverse current path between the motor armature and a DC power source such that the motor armature may regenerate electrical energy into the power source during braking. Controllable resistance means is connected between the armature and the power source to provide an initial current path through the armature to establish the proper polarity of motor flux to enable regenerative braking. The resistance means includes apparatus for removing it from the circuit when regenerative braking has been initiated. An additional resistive brake blending device is provided in the system for permitting braking current to continue to flow when the system is switched between regenerative braking and dynamic or plug braking.

BRIEF DESCRIPTION OF THE DRAWINGS

FIG. 1 is a partial schematic and partial block diagram of an electric traction motor control system incorporating the teachings of the present invention.

FIG. 2 shows a detailed implementation in simplified schematic form of the current limit circuit 46 and controlled acceleration circuit 44 of FIG. 1.

FIG. 3 shows how

FIGS. 3A–3D show a detailed implementation of the brake blending circuit 48 of FIG. 1.

DETAILED DESCRIPTION

Figure 3A:
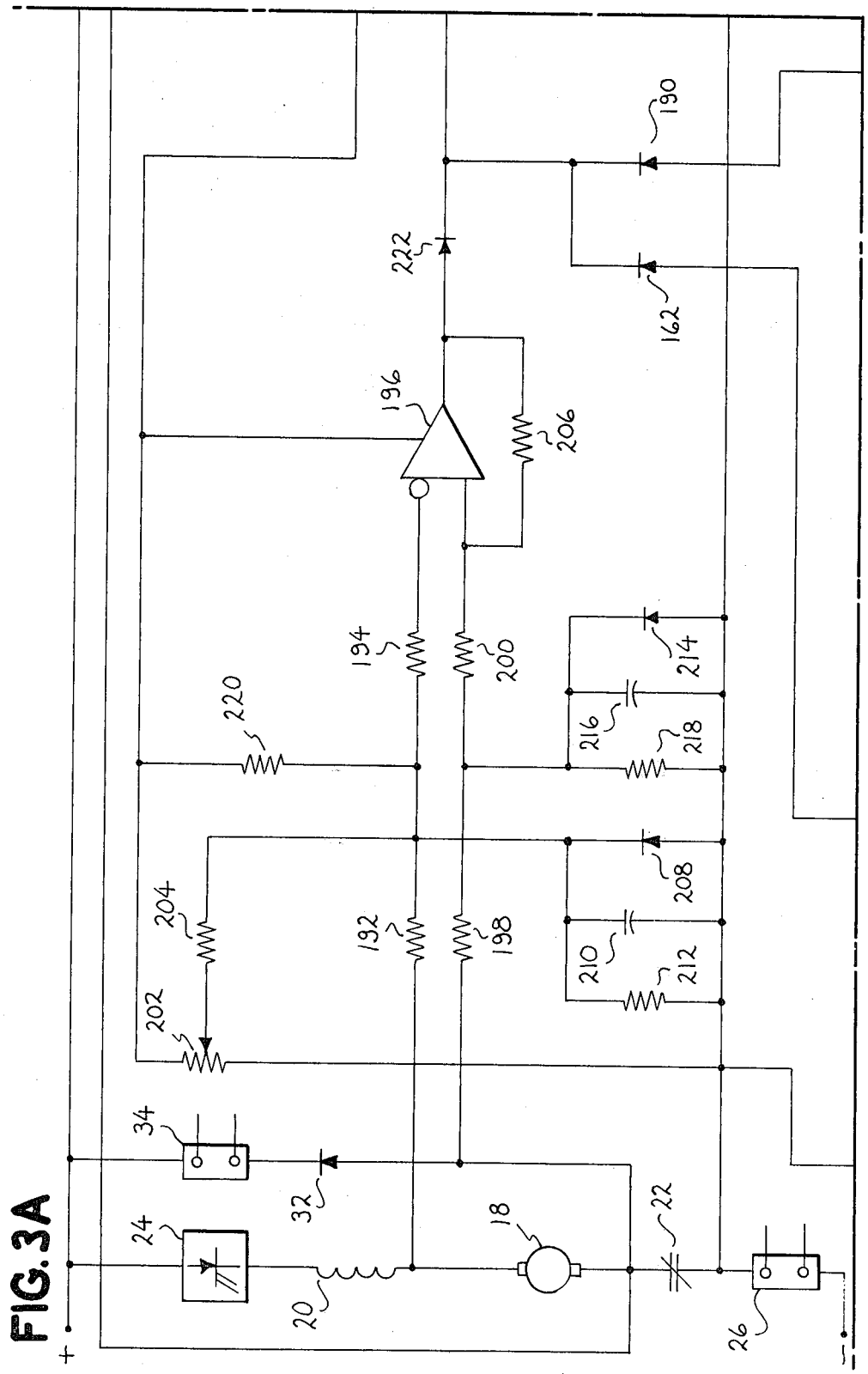
FIGS. 3A–3D are to be arranged.

Referring now to FIG. 1, there is shown a simplified partial schematic and partial block diagram of an electric traction motor control system incorporating the teachings of the present invention. Describing first those portions which are considered to be prior art, a suitable direct current electric power source 10, illustrated as a battery, is disclosed with a positive terminal connected through a power switch 12 to a positive power bus 14. A relatively negative terminal of the power source 10 is connected to a negative power bus 16. An electric traction motor comprising an armature 18 and a field winding 20 is connected between the power busses 14 and 16 by means of normally closed contacts 22 and a power regulating circuit 24. Preferably the power regulating circuit 24 is a time ratio control or chopper circuit of a type well known in the art. The motor field winding 20 is arranged to be connected in either a forward or a reverse direction by means of a plurality of contacts F1, F2, R1 and R2. A current shunt 26 connected in series between the traction motor and the power source 10 provides an indication of the magnitude of motor current. The motor power circuit also includes a plugging diode 28 connected between the power bus 16 and a junction intermediate the motor armature 18 and field winding 20. A free wheeling diode 30 is connected between the power bus 16 and the junction intermediate field winding 20 and power regulator circuit 24. The free wheeling diode 30 is utilized to provide a current path for the inductive motor current when the regulator circuit 24 is non-conductive. A regenerative braking diode 32 is connected from the junction between the contacts 22 and motor armature 18 to the positive power bus 14. A current shunt 34 connected in circuit between the braking diode 32 and positive power bus 14 provides an indication of the magnitude of regenerative braking current.

The forward and reverse contacts about field winding 20 are controlled by forward and reverse contactor coils 36 and 38, respectively. The contactor coils 36 and 38 are connected between the power bus 14 and power bus 16 by means of a multi-position forward/reverse switch 40. The switch 40 is controlled by a direction and brake logic circuit 42 responsive to operator input commands for determining the direction of rotation of the motor armature 18 and the desire for electrical braking of the motor.

A controlled acceleration circuit 44 responds to operator input commands for providing control signals to the regulator circuit 24 to control its percentage conduction time and thus the magnitude of current supplied to the motor field winding 20 and armature 18. A current proportional signal from the current shunt 26 to a current limit circuit 46 is utilized to limit and regulate motor current. In the regenerative braking mode of operation, the current shunt 34 provides a current proportional signal to the current limit circuit 46 which functions through the acceleration circuit 44 to control the conduction of regulator circuit 24 in order to provide the desired braking effort. The controlled acceleration circuit 44 and current limit circuit 46 are substantially the same as those circuits described in greater detail in U.S. Pat. No. 3,958,163 issued May 18, 1976, and assigned to the General Electric Company. That patent also describes the direction and brake logic circuit 42 and its operation in detecting and implementing electrical braking of the electric traction motor and the specification of that patent is hereby incorporated by reference. Diodes 39 and 41 in conjunction with resistor 43 form an OR function connected to contactor coils 36 and 38 to provide a logical 0 NEUTRAL signal when neither coil is energized.

In the operation of the above described power control circuit, the power switch 12 is closed to allow the power source 10 to energize the positive and negative busses 14 and 16, respectively. The direction control switch 40 is then placed in either a position to energize the forward contactors or the reverse contactors depending upon the desired direction of travel of the vehicle. In the illustration of FIG. 1 the switch 40 is placed in a position to energize the forward contactor coil 36 which closes the contacts F1 and opens the contacts F2 so that a current path is formed through the field winding 20 in a direction from left to right. In response to the position of an accelerator control, the controlled acceleration circuit 44 begins to supply gating signals to the power regulator circuit 24. The regulator circuit 24 repetitively connects and disconnects the motor between the power busses 14 and 16 to thereby control the average power applied to the traction motor. During the nonconducting interval of regulator circuit 24, motor current continues to flow, due to the inductive nature of the motor, through the loop formed by the free-wheeling diode 30.

In prior art systems, electrical braking is initiated by shutting off regulator circuit 24, allowing motor current to decay to near zero, opening the contacts 22 and reversing the connection of field winding 20. In order to assure that electrical braking will begin, a seed resistor (not shown) may be permanently connected in parallel with the contacts 22. However, such an arrangement is inefficient since the resistor will dissipate 10–15 percent of the available regenerative energy through thermal losses. The present invention avoids these undesirable thermal losses by providing apparatus for sensing that flux has been established in the proper polarity for regenerative braking and for removing the seed resistor once such flux is established.

Referring still to FIG. 1, a seed resistor 45 is connected in series with a collector-emitter junction of a transistor switch 47 across the normally closed contacts 22. A base terminal of transistor switch 47 is connected to an output terminal of a brake blending circuit 48. The brake blending circuit 48 is connected via lines 49 to monitor the terminal voltage across the armature 18.

The circuit 48 is responsive to signals appearing on line 51, labeled PLUG, for initiating conduction of transistor switch 47 to thereby connect the resistor 45 in circuit with armature 18. The PLUG signal on line 51 which causes transistor switch 47 to become conductive occurs substantially simultaneously with a signal on line 53 which energizes contactor coil 55, which coil 55 controls contacts 22. The circuit 48 thereafter removes the base drive to transistor switch 47 as soon as regenerative braking has begun.

The blending circuit 48 also functions to provide smooth transitioning from regenerative to plug braking. The transitioning circuit includes a resistor 57 and series connected thyristor 59 coupled across the contacts 22. Thyristor 59 is preferably a silicon controlled rectifier (SCR) and has a gate terminal connected to an output terminal of blending circuit 48. The thyristor 59 is gated into conduction at the end of the regenerative braking cycle prior to the closing of the contacts 22 in response to a REGEN signal on line 61, labeled REGEN, from current limit circuit 46 to blending circuit 48.

Although the resistors 45 and 57 are each connectable across the contacts 22, two separate resistors of distinctly different values are required to perform the two transition functions. The seed resistor 45 need only be sized to produce a relatively small exciting current in the motor, e.g., just sufficient to permit armature voltage to begin to buildup. The resistor 57, however, is sized large enough to prevent sudden surge currents but small enough to maintain a relatively large braking current while contacts 22 are closing and regulator circuit 24 is non-conductive. A typical value for resistor 45 is about 1.2 ohms while a typical value for resistor 57 is about 40 milliohms. The values suggested will vary with the type and characteristics of traction motor being controlled. In the illustrative system, the traction motor has a time constant of about 3 milliseconds and maintains a desirable braking torque at about 300 amperes of armature current. The contacts 22 typically close within 15 milliseconds. In addition, there is also a 200 millisecond delay after braking current drops below its desired value before the system begins to transition from regenerative to plug braking. If the regulator circuit 24 is gated off at a regenerative braking current slightly less than 300 amperes, within the 1–2 milliseconds required to gate thyristor 59 into conduction, the armature current will have decayed to about 150 amperes and armature voltage will be in the range of four to eight volts. Resistor 57, being connected across the armature 18 by thyristor 59 and diode 28, will force armature current to be in the range of 100 to 200 amperes thus maintaining torque while contacts 22 are closing and regulator circuit 24 is phased back into conduction at a time ratio suitable for plug braking, i.e., at about one percent duty cycle.

Referring now to FIG. 2, there is shown a more detailed implementation in simplified schematic form of the current limit circuit 46 and controlled acceleration circuit 44 of FIG. 1. The current limit circuit 46 comprises a plurality of comparators for comparing the motor armature current or the regenerative armature current to predetermined limit values and for providing an output signal to reduce the conduction of the current regulator circuit 24 when the actual current exceeds any of the limit values. A current limit circuit and controlled acceleration circuit of the type shown in FIG. 2 is also shown and described in U.S. Pat. No. 3,958,163 issued May 18, 1976, and assigned to the General Electric Company. The current limit circuit 46 comprises a differential amplifier 50 having first and second input terminals connected to monitor the voltage developed across the current shunt 26. An output terminal of differential amplifier 50 is connected through a first resistor 52 to an inverting input terminal of a comparator 54. The output terminal of differential amplifier 50 is also connected through a second resistor 56 to an inverting input terminal of a comparator 58. A non-inverting input terminal of comparator 54 is connected to receive a voltage V1 which may be developed by means of a first reference voltage source (not shown) connected between bus 14 and bus 16. Similarly, a voltage V2 developed by a second reference voltage source (not shown) connected between bus 14 and bus 16 is applied to a noninverting input terminal of comparator 58. An output terminal of comparator 54 and an output terminal of comparator 58 are connected to a common junction at the intersection of a first end of a resistor 60 and the cathode of a diode 62. The anode of diode 62 is connected through a resistor 64 to a control terminal of an oscillator 66. A second end of resistor 60 is connected to a bias reference voltage source V3 (not shown). A gating circuit comprising an inverter 68 and a diode 70 serially connected between the PLUG signal input terminal of current limit circuit 46 and comparator 54 and further including a second diode 72 serially connected between the PLUG signal input terminal of current limit circuit 46 and comparator 58 provide means whereby either comparator 54 or comparator 58 may be utilized as a current limit source for current limit circuit 46 depending upon whether or not the system is in a normal running mode of operation or in a plugging mode of operation.

The current limit circuit 46 also includes a second differential amplifier 74 having a pair of input terminals connected to monitor the voltage developed across the current shunt 34 in the regenerative braking current loop around the traction motor. An output terminal of differential amplifier 74 is connected through a resistor 76 to an inverting input terminal of a comparator 78. A non-inverting input terminal of comparator 78 is connected to a referenced voltage source V4 (not shown). An output terminal of comparator 78 is connected through a diode 80 and series connected resistor 82 to the junction intermediate the resistor 60 and diode 62. A diode 84 connected between the PLUG signal input terminal of current limit circuit 46 and the inverting input terminal of comparator 78 allows the operation of comparator 78 to be inhibited except when the control system is in an electrical braking mode. The diode 80 and resistor 82 are utilized between the output terminal of comparator 78 and the diode 60 in order to isolate a time delay circuit 86 which is utilized to take the control system out of regenerative braking mode when the regenerative braking current stays below its desired value for a predetermined time period.

A neutral signal applied to the current limit circuit 46 indicating that the vehicle is in a neutral mode, i.e., neither the foward nor reverse contactor coils 36 and 38 are energized, is applied through a diode 88 to an inverting input terminal of a comparator 90. An RC timing network comprising a resistor 92 and capacitor 94 is serially connected between a voltage source V and a ground potential. The junction intermediate the resistor 92 and capacitor 94 is connected to the inverting input terminal of comparator 90. A diode 96 interconnects the first input terminal of comparator 90 to the output terminal of comparator 78. A non-inverting input terminal of the comparator 90 is connected to a reference voltage source V5. An output terminal of comparator 90 is connected to a first input terminal of a cross-coupled NAND latch gate 98 of a type well known in the art. A second input terminal of the NAND latch gate 98 is connected to receive the PLUG signal from the direction and brake logic circuit 42. The NAND latch gate 98 comprises first and second NAND gates 100 and 102 with each gate having an output terminal connected to an input terminal of the other gate. The output terminal of comparator 90 is connected to an input terminal of the gate 102 and the PLUG signal is couple to an input terminal of the gate 100. An output terminal of the NAND latch gate 98 is connected to a first input terminal of a NAND gate 104. A second input terminal of NAND gate 104 is connected to receive the PLUG signal. An output terminal of NAND gate 104 is connected through an inverter driver circuit 106 to a contactor coil 108 which controls the regenerative braking contacts 22. An output signal developed at an output terminal of driver circuit 106 is also connected as the regenerative braking input signal to the blending circuit 48.

The controlled acceleration circuit 44 is preferably of the type shown in U.S. Pat. No. 3,958,163 identified above. The oscillator 66 is of the type adapted to provide a pulse width modulated output signal proportional to input voltage level and is connected to provide control pulses to the power switching regulator circuit 24. Such an oscillator is shown by way of example in U.S. Pat. No. 3,843,912 issued Oct. 22, 1974, and assigned to the General Electric Company. The percentage on-time of power switching circuit 24 controlling the application of current to motor armature 18 and motor field winding 20 is directly related to the percentage on-time of the pulses from oscillator 66 which in turn is directly related to the magnitude of a voltage signal applied to the input terminal of the oscillator 66. The voltage signal is developed in the controlled acceleration circuit 44 by a potentiometer 110 suitably connected between the power busses 14 and 16. A variable potential is supplied by the moveable arm of potentiometer 110 through a resistor 112 to the input terminal of oscillator 66. Potentiometer 110 may be connected to an accelerator control such as, for example, a foot pedal control, in order to provide controlled acceleration of the traction motor and its attendant vehicle. A capacitor 114 connected substantially in parallel with resistor 112 forms, in conjunction with resistor 112, an integrator to provide a controlled acceleration voltage to oscillator 66 in the event that potentiometer 110 is suddenly moved to a full voltage position. Under normal operating conditions, i.e., when the system is not in a current limit mode, the current supplied by the current regulator circuit 24 is directly related into the position of the moveable arm of potentiometer 110. However, in a current limit mode, the output voltages developed by the comparators 54, 58 or 78 operate through the diode 62 to reduce the voltage applied to the oscillator 66 to prevent overcurrent conditions. A transistor 116 connected with its collector-emitter junction across the capacitor 114 forces the percentage on-time signal to zero whenever the direction switch 40 is changed in position. As shown, the base of the transistor 116 is connected to receive an inverted NEUTRAL signal so that each time the direction control switch 40 moves through the neutral position the transistor 116 is gated into conduction to discharge capacitor 114 and reset the controlled acceleration circuitry.

The base terminal of transistor 116 is also connected to the output terminal of NAND gate 104 through a capacitor 118 and a diode 119. This latter connection assures that the controlled acceleration circuitry is reset when the system transitions from a regenerative braking mode to a plug braking mode. Capacitor 118 is discharged by a resistor 120 connected from ground to a junction intermediate diode 119 and capacitor 118. The magnitude of voltage supplied to the oscillator 66 is monitored by thresholding amplifier 122. The thresholding amplifier 122 which provides a signal through a resistor 124 to the direction and brake logic circuit 42 cancels the PLUG signal when the percent on-time rises above a predetermined level, e.g., 12 to 15 percent. Once the percent on-time of the regulator circuit 24 attains a value of about 12 to 15 percent, experience has shown that such a relatively high duty cycle is generally indicative that the armature 18 has essentially stopped rotating. Since the percent on-time may be higher during regenerative braking, the output terminal of NAND gate 104 is also connected via a diode 125 to the line from resistor 124 going to the direction and brake logic circuit 42. The signal from NAND gate 104 is used to inhibit the operation of amplifier 122 while the system is in the regenerative braking mode.

In the operation of the circuit of FIG. 2, the PLUG signal is a logical 1 or positive voltage level signal when it is desired to place the traction motor in an electrical braking mode. At all other times the PLUG signal is a logical 0 signal at or near ground potential. The NEUTRAL signal, which is indicative of neither the forward nor reverse contactors being energized, is at or near ground potential when the system is in neutral and is a positive voltage level or logical 1 signal when either the forward or reverse contactor coils 36 and 38 has been energized. Thus, when the system is in a neutral position, the diode 88 will be forward biased and conductive so that no charge will be allowed to accumulate on capacitor 94. In that case, the non-inverting input terminal of comparator 90 will be at a higher potential than the inverting input terminal such that the output terminal of comparator 90 will be at a positive potential. The positive potential produced by comparator 90 is applied as a logical 1 input signal to the NAND gate 102. However, since the PLUG signal is at a logical 0 level when the system is in neutral, the NAND latch gate 98 will be unaffected by the logical 1 from comparator 90. In addition, the near ground potential created by the NEUTRAL signal at the anode of diode 96 will reverse bias this diode so that it will have no effect on the output signal developed by the comparator 78.

Once either the forward or reverse contactor coil has been energized, the NEUTRAL signal will be removed, i.e., become a logical 1 and the diode 88 will be reverse biased so that the capacitor 94 begins to charge through the resistor 92 to a level which exceeds the reference voltage V5. The output signal developed by comparator 90 will then switch to a logical 0 potential. The logical 0 signal applied to NAND gate 102 will cause its output signal to switch to a logical 1 potential. However, since the PLUG signal is still at a logical 0 level, the output signal developed by NAND latch gate 98 will remain at a logical 1 potential. Also, the logical 0 PLUG signal will inhibit both the comparator 58 and the comparator 78 by virtue of their inverting input terminals being clamped at near ground potential through diodes 72 and 84 respectively. However, the inverter 68 inverts the logical 0 PLUG signal and provides a positive potential at the cathode of diode 70 thereby reverse biasing that diode. Accordingly, the signal proportional to armature current developed by the differential amplifier 50 is coupled through the resistor 52 and varies the positive voltage level at the inverting input terminal of comparator 54. Comparator 54 therefore functions as the normal current limit comparator for the system. The voltage V1 applied to the non-inverting input terminal of comparator 54 may be set at any desired current limit value for normal running conditions. When the monitored current through current shunt 26 exceeds the values set by the voltage V1, the output voltage developed by comparator 54 will drop to near ground potential. This ground potential will forward bias the diode 62 and provide a current path from the input terminal of oscillator 66 through the resistor 64 and diode 60 to ground. The resistor 64 is chosen to be such a small value as to force the input voltage to oscillator 66 to rapidly drop to a very low level. When the voltage input signal to oscillator 66 is reduced, its output signals are varied in such a manner as to reduce the conduction time of regulator circuit 24 so as to reduce the level of current through the traction motor.

When the direction control switch 40 moves from either a forward to reverse position or reverse to forward position, a PLUG signal is generated. Since the PLUG signal is preferably a logical 1 level signal, the inverter 68 produces a logical 0 level signal which clamps the inverting input terminal of comparator 54 to a low level thereby inhibiting its operation. However, the logical 1 signal reverse biases both the diode 72 and the diode 84 thereby removing the inhibit function from both comparator 58 and comparator 78. More importantly, however, the switching between forward and reverse passes through neutral, thereby discharging the capacitor 94 and changing the output level of comparator 90 from a logical 0 to a logical 1 level. This change in conjunction with the PLUG signal going to a logical 1 level causes the output signal of latch gate 98 to go to a logical 1 potential. Since both inputs to NAND gate 104 are then at a logical 1 potential, its output immediately drops to a logical 0 level. This latter signal applied through the inverter driver 106 energizes the contactor coil 108 to thereby open the contacts 22. The signal from inverter driver 106 is also applied as the regenerative braking signal (the REGEN signal) to the blend control circuit 48. The logical 0 signal developed by the NAND gate 104 is also coupled into the control acceleration circuit at the output terminal of resistor 124 and holds that terminal at a logical 0 so long as regenerative braking is in effect so as to prevent cancelling of electrical braking by amplifier 122.

Since transition from the forward to reverse mode of operation reverses the connections of the field winding, the flux in the field and armature may be insufficient or of the wrong polarity to allow current to begin to flow in the regenerative braking loop with the contacts 22 open. Accordingly, the brake blending circuit 48 applies a gating signal to the transistor 47 to gate it into conduction and connect the resistor 45 in a short circuit path around the contacts 22. When the regulator circuit 24 thereafter begins conducting, a current path is formed from the battery 10, through the regulator circuit 24, field winding 20, armature 18, resistor 45 and transistor 47. This current path permits the flux to be reset in the field winding and regenerative braking to begin. As mentioned previously, transistor 47 is only allowed to be conductive for a maximum time of less than one second. Within this time period, current will begin to build up in the loop comprising the diode 32 and current shunt 34. So long as the current through the current shunt 34 continues to reach the current limit value each time the current regulator 24 is gated into conduction, the system will be allowed to remain in regenerative braking mode. In particularly, the differential amplifier 74 monitors the regenerative braking current through the current shunt 34 and provides a signal to the inverting input terminal of comparator 78 proportional to that current level. Each time that the current level reaches the value determined by the reference potential V4, the comparator 78 will provide a near ground output potential through the diode 80, resistor 82, diode 60 and resistor 64 current path which will reduce the excitation to oscillator 66. At the same time, the near ground potential coupled through diode 96 will prevent the capacitor 94 from charging. Essentially, the oscillator 66 gates the current regulator 24 into conduction and builds the current up to its current limit value. Thereafter, the comparator 78 turns off the oscillator and allows the current to free wheel through the diode 30 to current shunt 34 and back into the power source 10. When the current drops below the threshold levels established by reference potential V4, the comparator 78 changes state and again allows the oscillator 66 to gate the current regulator 24 into conduction. If the current limit value is not attained within the time required for the capacitor 94 to charge, the comparator 90 will be triggered and change its output state to a logical 0 level forcing the output signal developed by the NAND gate 102 to a logical 1 level and causing the output signal developed by the latch circuit 98 to go to a logical 0 level. This logical 0 level will change the output of NAND gate 104 to a logical 1 level signal, which signal, when inverted by inverter driver 106 will de-energize the regenerative braking contactor coil 108.

Figure 3B:
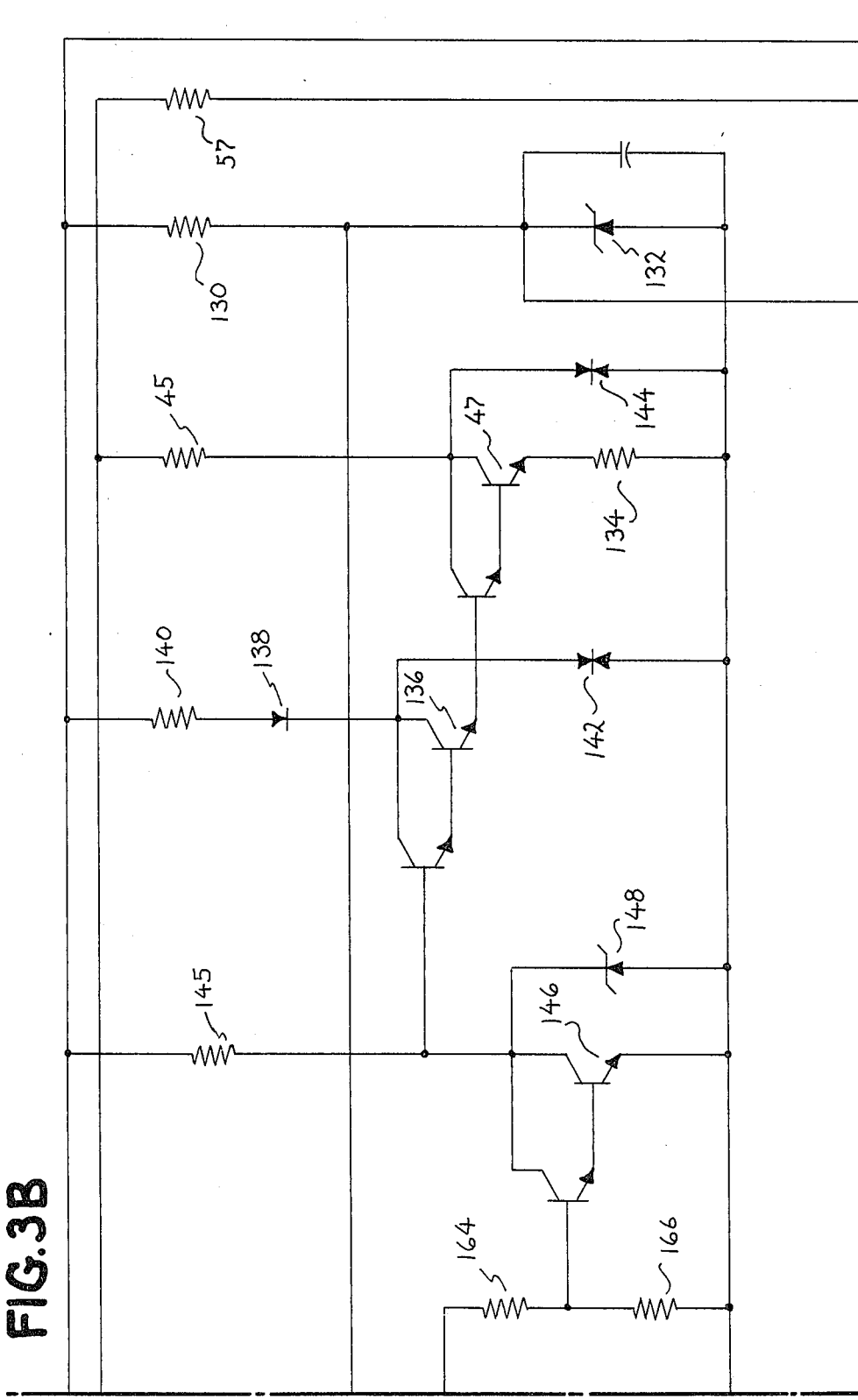
Figure 3C:
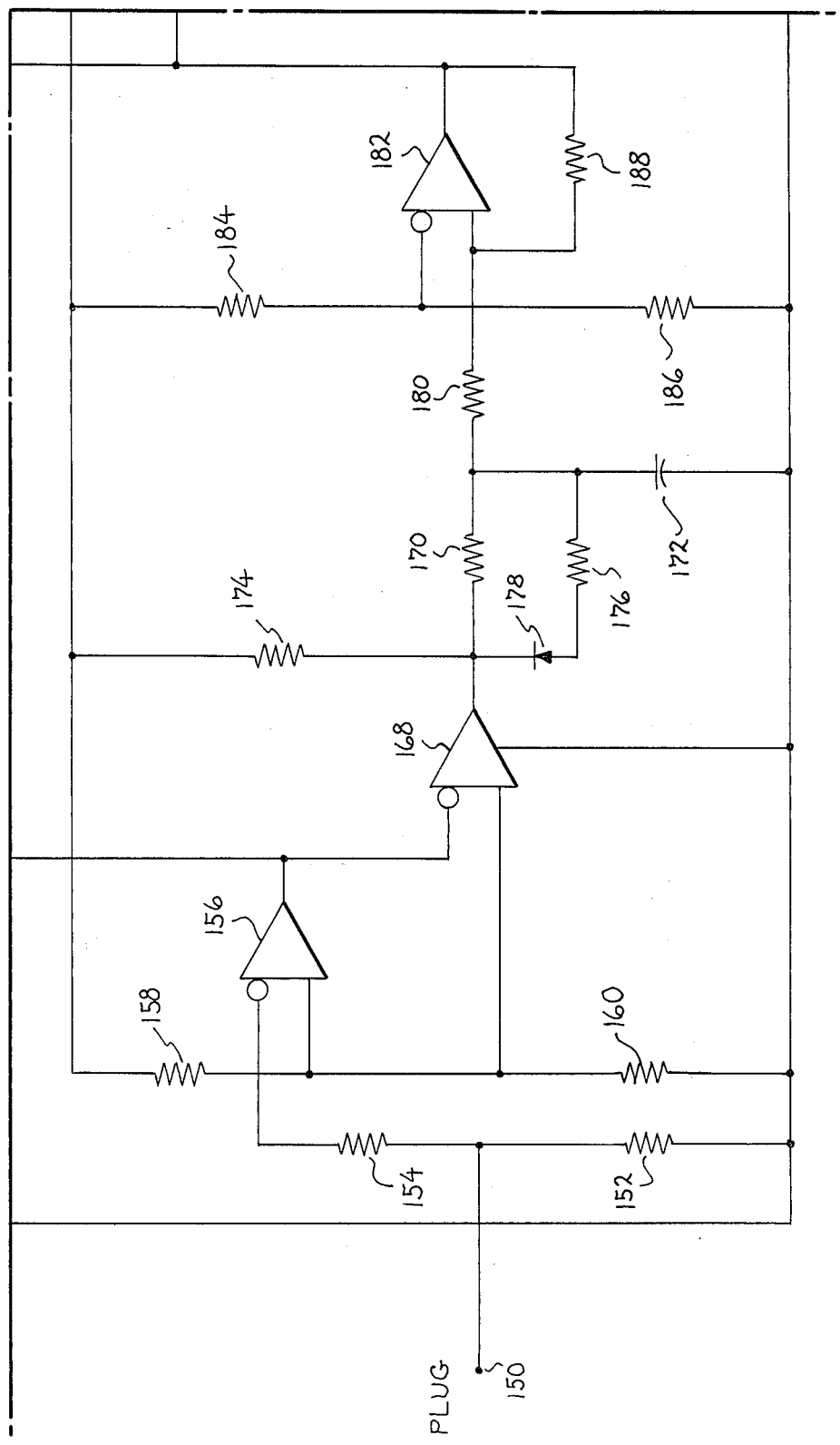
Figure 3D:
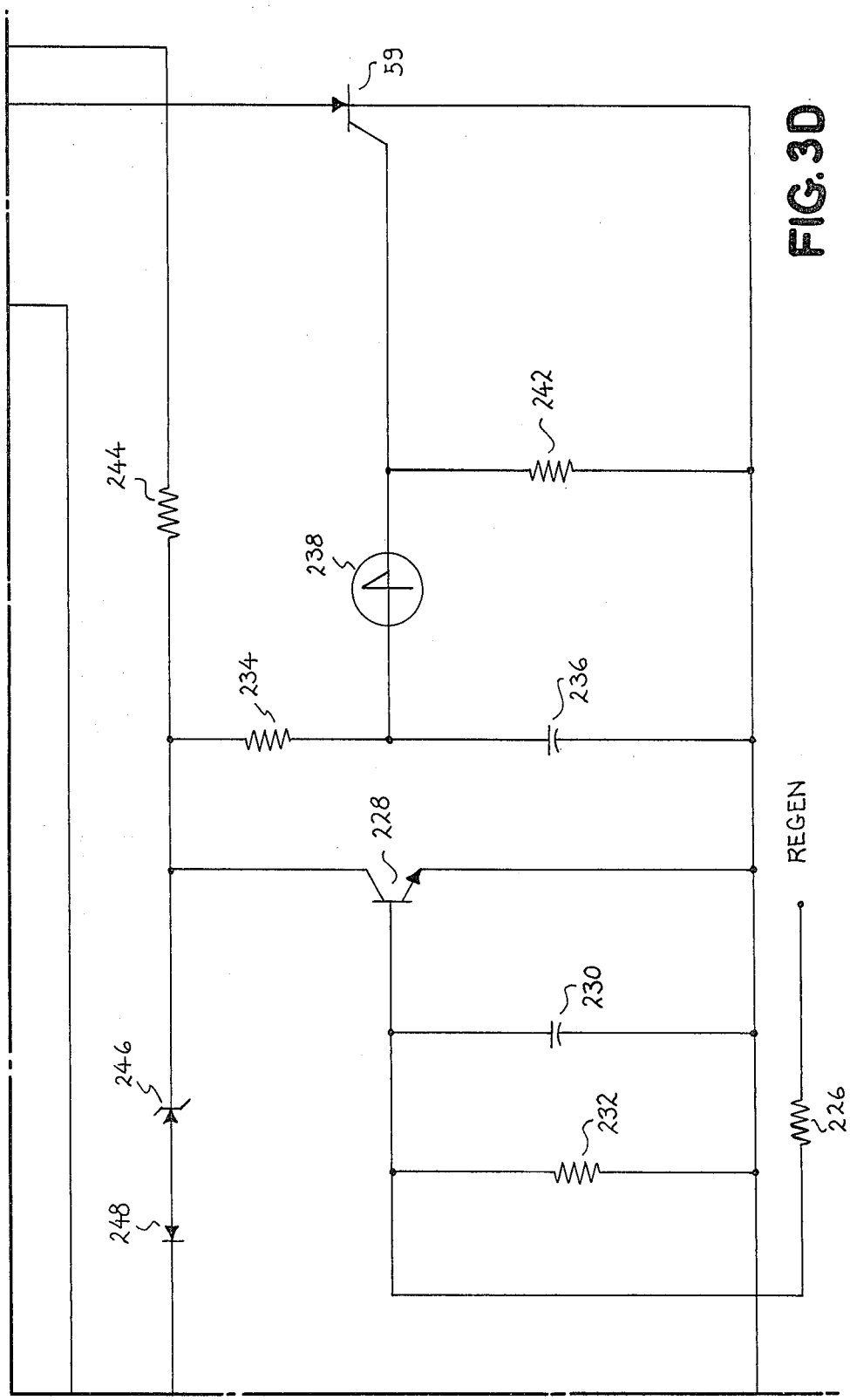

Referring now to FIG. 3 comprising the drawing sheets labeled FIG. 3A, FIG. 3B, FIG. 3C and FIG. 3D, there is shown a more detailed implementation of the brake blending circuit 48. References to FIG. 3 will hereinafter be intended to refer to the schematic representation embodied in FIGS. 3A through 3D. For purposes of clarity, a portion of the electric traction motor power circuit is shown in FIG. 3 except that the reversing contactors normally associated with the field winding 20 have been omitted. The series combination of transistor switch 47 and resistor 45 is connected across the normally closed contacts 22 controlled by the regenerative braking contactor coil 55. A resistor 130 and Zener diode 132 connected between positive and negative power busses 14 and 16 provide at their junction a reference voltage for the electronic components in the blending circuit. In a preferred form the transistor switch 47 comprises two transistors connected in a Darlington arrangement and includes a nominal 15 milliohm resistor 134 connected in the emitter current path. The transistor switch 47 is driven by a second Darlington transistor amplifier 136 which has its output emitter terminal connected to the base input terminal of the switch 47. The Darlington transistor amplifier 136 is supplied with current through a series connected diode 138 and resistor 140 connected between the collector terminal of the amplifier 136 and positive bus 14. Diode 138 acts as a reverse battery protection diode for the Darlington amplifier 136. A metal oxide varistor 142 connected between the collector of Darlington amplifier 136 and ground and a second metal oxide varistor 144 connected between the collector Darlington switch 47 and ground serves to protect the transistors from high voltage spikes. The base drive for Darlington amplifier 136 is derived from positive battery voltage via a resistor 145 connected from the base terminal of amplifier 136 to positive bus 14. Control of the gating of amplifier 136 is through an additional Darlington transistor amplifier switch 146 having its collector junction connected to the base terminal of amplifier 136 and its output emitter terminal connected to battery negative. A Zener diode 148 connected from the collector to the output emitter terminal of switch 146 provides overvoltage protection to the transistors.

In the normal running mode of the vehicle, i.e., when neither plug nor regenerative braking is in effect, the direction and brake logic circuit 42 provides a logical 0 PLUG signal which is near negative battery voltage potential. The PLUG signal is applied to an input terminal 150 and across an input resistor 152 connected between terminal 150 and ground potential. The PLUG signal is coupled from input terminal 150 through an input resistor 154 to an inverting input terminal of an operational amplifier 156. The operational amplifier 156 is connected as a comparator and has its non-inverting input terminal biased at a predetermined positive level by means of a resistive voltage divider comprising resistors 158 and 160 connected between the voltage potential developed at the cathode of Zener diode 132 and circuit ground. The junction intermediate resistors 158 and 160 is connected to the non-inverting input terminal of the amplifier 156. An output terminal of the amplifier 156 is connected through a diode 162 and a resistor 164 to the base terminal of the Darlington transistor switch 146. A base biased resistor 166 is connected between the base terminal of the switch 146 and ground. It will be apparent that so long as the PLUG signal is at a logical 0 level, the logical 1 signal developed by amplifier 156 will be at a positive level and will apply a biasing voltage to the switch 146 to maintain it in conduction. Since conduction of switch 146 short circuits the base terminal of amplifier 136, amplifier 136 will be in a nonconducting mode and no base drive current will be supplied to the transistor 47 thereby maintaining it in an open circuit condition.

An output terminal of amplifier 156 is also connected to an inverting input terminal of a comparator 168, a noninverting or reference input terminal of comparator 168 being connected to the reference voltage developed intermediate the resistors 158 and 160. An output terminal of comparator 168 is connected through a resistor 170 and capacitor 172 to ground. The resistor 170 and capacitor 172 comprise a timer circuit. A pull up resistor 174 connects the output terminal of comparator 168 to the supply voltage developed by Zener diode 132. A resistor 176 and series connected diode 178 connected between the junction intermediate resistor 170 and capacitor 172 and the output terminal of comparator 168 provides a rapid discharge path for the capacitor 172 to thus reset the timer circuit. The timer circuit, as will become apparent, limits the length of time that the transistor 47 is conductive in the event of a failure of the main control function. In a preferred form the time required for the capacitor 172 to charge to its threshold value is about 0.6 seconds. The charge developed on capacitor 172 is coupled through a resistor 180 to a noninverting input terminal of a comparator 182. The inverting input terminal of comparator 182 is connected to a junction intermediate a pair of series connected bias resistors 184 and 186, which bias resistors are connected between ground and the voltage developed by diode 132. An output terminal of comparator 182 is connected to its noninverting input terminal via a resistor 188 to provide a positive latching function. The output terminal of comparator 182 is connected through a diode 190 and the resistor 164 to the base terminal of the Darlington switch 146. Thus, any signal developed by the comparator 182 will also serve to gate the Darlington switch 146 into conduction and remove base drive to the switching transistor 47.

The base drive for transistor switch 146 is also controlled in response to the voltage developed across the motor armature 18. The junction intermediate the armature 18 and field winding 20 is connected through the series combination of a resistor 192 and a resistor 194 to an inverting input terminal of a comparator 196. The junction intermediate the armature 18 and contacts 22 is connected through the series combination of resistors 198 and 200 to the non-inverting input terminal of amplifier comparator 196. The trip point at which the comparator 196 switches state is a function of the voltage across the armature 18 and is determined by the setting of a potentiometer 202. The potentiometer 202 is connected across the Zener diode 132 and has a movable tap connected through a resistor 204 to the junction intermediate the resistors 192 and 194. A positive feedback resistor 206 connected from an output terminal of the comparator 196 to its non-inverting input terminal provides a small hysteresis in the differential sensing circuit. A noise filtering circuit comprising the parallel combination of a diode 208, a capacitor 210 and a resistor 212 is connected between the junction intermediate resistors 192 and 194 and circuit ground. An identical noise filtering circuit comprising a diode 214, a capacitor 216 and a resistor 218 is connected from ground to the junction intermediate resistor 198 and 200. A resistor 220 connected between the cathode of Zener diode 132 and the junction intermediate resistors 192 and 194 provides assurance of limiting the voltage at the input of comparator 196 in the event of failure of potentiometer 202. The output terminal of comparator 196 is connected through a diode 222 and the resistor 164 to the base terminal of Darlington switch 146. Accordingly, three separate controls are provided to assure that Darlington switch 146 is gated into conduction to thereby prevent the seed resistor 45 from being maintained across the open contacts 22 for an excessive time period.

The blend thyristor 59 for maintaining current conduction through the motor armature 18 while the contacts 22 close is also controlled by the blending circuit 48. The regenerative signal supplied by the current limit circuit 46 is connected to a REGEN terminal and coupled through a resistor 226 to a base terminal of a switching transistor 228. A capacitor 230 and parallel connected resistor 232 connected between the base terminal of transistor 228 and ground provide noise filtering. The REGEN brake signal, having a relatively positive potential, applied to the base terminal of transistor 228 will maintain it in conduction thereby providing a short circuit across the series combination of a resistor 234 and a capacitor 236. The resistor 234 and capacitor 236 constitute a timer. A unilateral switch 238 is connected between the junction intermediate resistor 234 and capacitor 236 and the gate terminal of blend thyristor 59. A gate charge bleed-off resistor 242 is connected between the gate terminal of thyristor 59 and ground. So long as the REGEN signal is present, the transistor 228 will be maintained in conduction and no charge will be allowed to accumulate on capacitor 236. Thus, the timer function will be inhibited. When the REGEN signal is removed, the capacitor 236 will begin to charge from the positive voltage bus 14 through a resistor 244 and resistor 234. While transistor 228 is non-conductive, the bus 14 also provides a potential through the resistor 244, a Zener diode 246 and a diode 248 to the output terminal of comparator 182. This latter function assures that a positive voltage is supplied to the gate terminal of Darlington switch 146 to inhibit the conduction of transistor 47.

When the capacitor 236 is charged to a predetermined value, the unilateral switch 238 will break over and supply a current pulse to the gate of thyristor 59 to initiate its conduction. Conduction of thyristor 59 will connect the resistor 57 across the contacts 22 to maintain armature current conduction during their closing time. Once the contacts 22 are closed, the short circuit appearing across the thyristor 59 will cause it to cease conduction. In a preferred form, the charging time of capacitor 236 is selected to be about 4 milliseconds so that the thyristor 59 is gated into conduction in two to three milliseconds after the REGEN signal is dropped.

In the operation of the circuit of FIG. 3, when the system is in the electrical braking mode, for at least a first predetermined time period set by the charging time of capacitor 94, which may be, for example, 200 milliseconds, both a PLUG signal and a REGEN braking signal will be provided to the blending circuit 48. The presence of the REGEN braking signal at terminal 224 will gate the transistor 228 into conduction and thereby inhibit the operation of the RC timer circuit comprising the resistor 234 and capacitor 236. The PLUG signal will cause the output signal of comparator 156 to become negative thereby reverse biasing diode 162. The near ground potential at the output terminal of comparator 156 will cause the output signal developed by comparator 168 to go to a positive potential and start the timer comprising resistor 170 and capacitor 172. At the initiation of braking, the armature voltage is at substantially zero potential since the current regulator circuit 24 is non-conductive and the field winding has just been reversed. Therefore, the comparator 196 will generate a near ground potential and reverse bias the diode 222. With diodes 162, 190, and 222 all reverse biased, no base drive current is supplied to the transistor Darlington switch 146 and it will be forced to an off or non-conductive condition. With switch 146 non-conductive, base drive current is supplied through the resistor 145 to the base terminal of transistor amplifier 136 which in turn will supply drive current and transistor 47 thereby connecting the resistor 45 across the contacts 22 to thereby allow initial flux to be established in the proper polarity in the field winding 20 and armature 18. After a time period of approximately 0.6 seconds, if regenerative braking has not been established and detected by comparator 196, the voltage on capacitor 172 will have reached a level sufficient to trigger comparator 182 and cause its output signal to go to a relatively positive potential. This potential will be applied through the diode 190 as base drive current to the transistor switch 146. Conduction of switch 146 will then occur and pull base current away from the transistor amplifier 136 causing the transistor 47 to become non-conductive. Thereafter, the only current path for the traction motor is the circulating loop through the diode 32 and current regulator 24 or, when regulator 24 is non-conductive, through the loop comprising the diode 32, power source 10 and diode 28. Conduction of current regulating circuit 24 will be minimum and just sufficient to supply excitation current to the field winding 20. Typically, the percent on-time for a chopper circuit used as current regulator circuit 24 is of a magnitude of approximately one percent.

When the system detects that it takes longer than 200 milliseconds for the regenerative braking current to achieve a current limit value, the time comprising resistor 92 and capacitor 94 drops the regenerative braking signal. At this point, the contacts 22 begin to close. Since the armature potential at its connection to contactor 22 may be at or near battery potential and the potential on the other terminal of the contactor 22 is at or near ground potential, arcing may occur across the contacts if they are suddenly closed. Thus, the circuit of FIG. 3 provides a current shunt, comprising the resistor 57, which is connected across the contacts 22 prior to their closing. In particular, when the regenerative braking signal reverts to a logical 0 level, the transistor 228 becomes non-conductive. The timer comprising resistor 234 and capacitor 236 charges within one to two milliseconds to a value sufficient to trip the unilateral switch 238 and provide a gating signal to the thyristor 59. Since the actuation time of the contacts 22 is typically 10–15 milliseconds, the resistor 57 and thyristor 59 will provide an alternate current path shunting the contacts 22 until such time as the contacts are closed. This shunting action prevents arcing and burning of the contact tips but more importantly maintains armature current during the transition period to prevent jerking of the vehicle.

While there has been shown and described what is at present considered to be a preferred embodiment of the invention, modifications thereto will readily occur to those skilled in the art. It is desired, therefore, that the invention not be limited to the specific arrangement shown and described. It is intended to that the appended claims encompass all such modifications and arrangements as may fall within the true spirit and scope of the invention.

What is claimed is:

1. An improved electrical brake blending apparatus for a direct current electric motor power system, the motor having first and second power terminals and including a field winding and an armature, the system including a DC power source connected between a first and second power bus, power contacts for connecting the first terminal of the motor to the first power bus, power regulating means for connecting the second motor terminal to the second power bus, unidirectional conducting means connected between the first terminal of the motor and the second power bus and means for initiating electrical braking of the motor by reversing the relative polarity of the motor field winding and armature and opening the power contacts while the armature is rotating, the improvement comprising:
    (a) a first relatively low ohmic value resistance;
    (b) first switching means, said switching means and said resistance being connected in a series circuit path in parallel with the contacts;
    (c) means for momentarily actuating said first switching means upon initial opening of the contacts whereby an alternate current path between said motor and said power supply is provided in order to establish a desired polarity of flux in the motor to enable electrical braking;

(d) a second relatively low ohmic value resistance;

(e) a second switching means;

(f) means for connecting said second resistance and said second switching means in a series circuit path in parallel with the contacts;

(g) means for closing the contacts during electrical braking for converting said system from regenerative to plug braking; and, (h) means for actuating said second switch means immediately prior to closing the contacts to thereby provide an alternate armature current path to enable relatively smooth transitioning from regenerative to plug braking.

2. The improvement of claim 1 wherein said contacts closing means comprises:

(a) means for providing a current command signal representative of a desired magnitude of braking current for said electric motor;

(b) current sensing means for sensing the magnitude of regenerative braking current; and, (c) control means for comparing the magnitude of said sensed regenerative current to the magnitude of said commanded current, said control means providing a signal to close the contacts and to force said system to switch from regenerative to plug braking when the sensed magnitude of regenerative current is less than said commanded magnitude of regenerative current for a predetermined time interval.

3. The improvement of claim 1 wherein said second resistance has a relatively small value in comparison to the value of said first resistance.

4. The improvement of claim 1 wherein said means for momentarily actuating said first switching means comprises:

(a) means for generating an electrical braking signal;

(b) means for energizing said first switching means in response to said electrical braking signal; and, (c) means for monitoring the potential developed on the motor armature and for de-energizing said first switching means when said potential attains a predetermined value.

5. The improvement of claim 5 wherein said means for reversing the relative polarity of the motor field and armature comprises electro-mechanical contactor means for reconnecting said motor field winding and said armature in reversed directions, said contactor means being responsive to a direction control switch for affecting said reversal, the system including sensing means for sensing a reversal of the connection of said motor field and armature and for initiating said electrical braking signal in response thereto.

6. The improvement of claim 4 and including timing means initiated by generation of said electrical braking signal, said timing means providing a signal to de-energize said first switching means after a predetermined time interval.

* * * * *